J. RADDIN.
Car Wheel.
No. 108,825.  Patented Nov. 1, 1870.
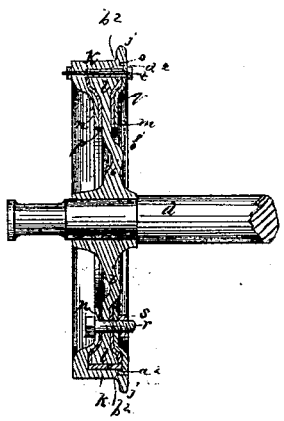
Witnesses.  Inventor.
S. B. Kidder.  John Raddin
M. W. Frothingham.  by his Attys
Crosby, Halsted & Gould

UNITED STATES PATENT OFFICE.

JOHN RADDIN, OF LYNN, MASSACHUSETTS.

IMPROVEMENT IN CAR-WHEELS.

Specification forming part of Letters Patent No. 108,825, dated November 1, 1870; antedated October 19, 1870.

*To all whom it may concern:*

Be it known that I, JOHN RADDIN, of Lynn, in the county of Essex and State of Massachusetts, have invented an Improvement in Car-Wheels; and I do hereby declare that the following, taken in connection with the drawing which accompanies and forms part of this specification, is a description of my invention sufficient to enable those skilled in the art to practice it.

United States Letters Patent Nos. 64,796, 74,939, 76,811 have been granted to me for improvements in car-wheels, such improvements having particular reference to means used for rendering the wheel elastic or yielding between the axle and tread and also laterally. In my present invention I have the same object in view, my improvements relating particularly to details of construction for cushioning the hub upon the periphery or tire of the wheel, and relatively to radial flanges projecting inwardly from the tire, and to provision for slight lateral yield of the two wheels of a car-axle relatively to each other.

My invention consists in constructing a car-wheel in three parts, a hub and its web forming one part, (the perimeter of the web being flanged to form a sort of sub-tire,) a main tire forming a second part, this tire having an inwardly-projecting radial flange or flange-plate, which extends in toward the web and under the flanged perimeter thereof, and a plate-ring forming the third part, such ring covering part of the opposite side of the web and extending under the flanged perimeter thereof, this ring-plate and the tire being bolted together, and caoutchouc or other elastic packing being interposed between the periphery of the web and the tire, and between the sides of the web and the tire-flange and plate-ring, this construction hanging or suspending the axle from the tire above it, (upon an elastic cushion,) as well as supporting it upon the tire beneath it upon a similar cushion.

The drawing represents a sectional elevation of a wheel.

*a b* denote the two halves of the axle, connected by two coupling-sleeves, *c d*, the flanges of which are bolted together by screw-bolts *e* and nuts *f*. *g h* denote the two wheels. The hub of the wheel *g* has a radial web, *i*, extending toward the tire *k*, and the periphery of this web is cast thicker than the main portion thereof, or with a projection on each side that forms a sub-tire or tread, *l*, as seen in the drawing. The main tire *k* is cast separate from the web and with the usual flange or lip, *j*. On the opposite side of this flange the tire is cast with an inward flange or plate, *n*, this flange extending in toward the web *i* and under the flange or sub-tire *l*, as seen in the drawing. On the opposite side of the wheel is the ring *m*, made of plate-metal, (preferably boiler-iron,) the outer edge of the ring setting down into the side of the tire *k*, and slightly within this edge the ring is bent, so as to bring it under the sub-tire *l* and against or adjacent to the web, as seen in the drawing. Between the periphery of the sub-tire and the main tire a thick ring, *o*, of caoutchouc, is interposed, and between the bent flange *n* of the main tire and the web and the side of the sub-tire an elastic packing-ring, *p*, is placed, and a similar ring, *q*, between the ring *m* and the opposite side of the web and sub tire. The web *i*, tire-flange *n*, and ring *m* are then fastened together by suitable screw-bolts, *r*, and nuts *s*. By inspection of the drawing it will be obvious that the web above the axle is hung or suspended from the main tire above it, (the sub-tire resting upon the elastic cushions interposed between it and the inwardly-projecting parts or bends of the tire *k* and ring *m*,) and that below the axle the sub-tire rests upon the elastic ring *o*. Thus the axle is supported both above and below by the elastic material.

Wheels thus formed may be very cheaply made and repaired, and are much more enduring than common cast wheels. The wheel can be very easily taken to pieces, and its tire replaced by a new one when worn or injured.

To prevent the ring *o* from slipping around the web, small bolts *t* may pass directly through it and through the ring *m* and flange *n*, as seen in the drawing. The small bolts *t*, besides serving to keep the elastic ring *o* in place, also serve to keep the edge of the plate *m* from springing outwardly at the edge, which it might incline to do were the bolts *r* alone depended upon, as these bolts *r*, to pass through the web *i*, have to be located near the inner edge of the ring or plate *m*, and are also needed there to keep such inner edge up to or toward the web, The ring $m$ is made with a slight lip, $a^2$, projecting from its inner face near the edge, and opposite this lip the tire $k$ has a groove, $b^2$, into which the lip enters, the locking of this lip and groove together preventing the entrance of dust and gravel and the expansion of the packing outwardly between the edge of the ring and the tire.

I claim—

1. In combination with the web $i$ and its sub-tire $l$, the tire-flange $n$ and ring $m$, with the elastic packing or rings $p$ $q$ interposed between the flange and ring and the sub-tire and web, substantially as shown and described.

2. In combination with the radially-bent plate $m$, the bolts $t$ and the bolts $r$, substantially as described.

JOHN RADDIN.

Witnesses:
  FRANCIS GOULD,
  S. B. KIDDER.